(12) United States Patent
Schnabel et al.

(10) Patent No.: US 10,695,885 B2
(45) Date of Patent: Jun. 30, 2020

(54) METHOD FOR PRODUCING BEARING COMPONENTS BY MEANS OF A PRODUCTION LINE, PRODUCTION LINE AND PRODUCTION SYSTEM

(71) Applicant: SCHAEFFLER TECHNOLOGIES AG & CO. KG, Herzogenaurach (DE)

(72) Inventors: Wolfgang Schnabel, Aurachtal (DE); Benno Sterzinger, Roedelmaier (DE); Detlef Scholtz, Hassfurt (DE); Martin Lutz, Untertheres (DE); Thomas Schmitt, Schalkau (DE); Andre Kuckuk, Herzogenaurach (DE); Werner Heuer, Vallendar (DE); Klaus Pichl, Herzogenaurach (DE); Daniel Seubold, Marktgraitz (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 241 days.

(21) Appl. No.: 15/748,425

(22) PCT Filed: Aug. 10, 2016

(86) PCT No.: PCT/DE2016/200365
§ 371 (c)(1),
(2) Date: Jan. 29, 2018

(87) PCT Pub. No.: WO2017/028855
PCT Pub. Date: Feb. 23, 2017

(65) Prior Publication Data
US 2018/0215005 A1 Aug. 2, 2018

(30) Foreign Application Priority Data

Aug. 17, 2015 (DE) .................. 10 2015 215 624

(51) Int. Cl.
*B24B 5/04* (2006.01)
*B24B 27/00* (2006.01)
(Continued)

(52) U.S. Cl.
CPC ............ *B24B 5/047* (2013.01); *B23Q 7/1494* (2013.01); *B23Q 11/0042* (2013.01); *B24B 5/08* (2013.01);
(Continued)

(58) Field of Classification Search
CPC .. B24B 5/047; B24B 5/08; B24B 5/12; B24B 5/355; B24B 19/06; B24B 27/0023;
(Continued)

(56) References Cited

U.S. PATENT DOCUMENTS 2,280,379 A * 4/1942 Cramer .................. B24B 19/06
451/52
2,912,795 A 11/1959 Jessup et al.
(Continued)

FOREIGN PATENT DOCUMENTS

CN 1619171 A 5/2005
CN 1696525 A 11/2005
(Continued)

OTHER PUBLICATIONS

Office Action for German Application No. 102015215624.9, dated Aug. 17, 2015, 5 Pages.
(Continued)

*Primary Examiner* — George B Nguyen
(74) *Attorney, Agent, or Firm* — Brooks Kushman P.C.

(57) ABSTRACT

A method for producing one or more bearing components along a production line, comprising honing the bearing components along the production line, cleaning the bearing components along the production line, grinding the bearing components along the production line, and transporting the (Continued)

bearing components along the production line utilizing one or more transport units.

16 Claims, 4 Drawing Sheets

(51) Int. Cl.
| | |
|---|---|
| *B24B 33/02* | (2006.01) |
| *B24B 5/08* | (2006.01) |
| *B24B 19/06* | (2006.01) |
| *B24B 5/35* | (2006.01) |
| *B24B 33/04* | (2006.01) |
| *B24B 49/00* | (2012.01) |
| *B24B 55/06* | (2006.01) |
| *B24B 5/12* | (2006.01) |
| *B24B 41/00* | (2006.01) |
| *B23Q 11/00* | (2006.01) |
| *B23Q 7/14* | (2006.01) |

(52) U.S. Cl.
CPC .............. *B24B 5/12* (2013.01); *B24B 5/355* (2013.01); *B24B 19/06* (2013.01); *B24B 27/0023* (2013.01); *B24B 27/0069* (2013.01); *B24B 33/02* (2013.01); *B24B 33/04* (2013.01); *B24B 41/005* (2013.01); *B24B 49/00* (2013.01); *B24B 55/06* (2013.01)

(58) Field of Classification Search
CPC ..... B24B 27/0069; B24B 33/02; B24B 33/04; B24B 41/005; B24B 49/00; B24B 55/06
USPC .............................. 451/1, 65, 67, 58, 52, 336
See application file for complete search history.

(56) References Cited

U.S. PATENT DOCUMENTS

| | | | | | |
|---|---|---|---|---|---|
| 3,089,289 | A | * | 5/1963 | Serafin | B24B 19/06 451/52 |
| 3,399,498 | A | * | 9/1968 | Lampani | B24B 9/00 451/308 |
| 3,562,960 | A | * | 2/1971 | Thielenhous | B24B 19/06 451/163 |
| 3,685,208 | A | * | 8/1972 | Richter | B24C 3/12 451/67 |
| 3,768,208 | A | * | 10/1973 | Plichta | B24B 39/06 451/67 |
| 3,881,886 | A | | 5/1975 | Hoare | |
| 4,240,231 | A | * | 12/1980 | Day | B23Q 7/035 451/184 |
| RE30,976 | E | * | 6/1982 | Wunder | B24B 41/005 451/163 |
| 4,424,620 | A | * | 1/1984 | Oshinsky | B23Q 7/03 29/527.6 |
| 4,760,671 | A | * | 8/1988 | Ward | B23Q 7/03 198/346.2 |
| 5,174,069 | A | * | 12/1992 | Thielenhaus | B24B 19/06 451/9 |
| 5,531,636 | A | * | 7/1996 | Bissen | B24B 7/12 451/130 |
| 5,913,712 | A | * | 6/1999 | Molinar | B24B 37/042 451/285 |
| 5,989,105 | A | * | 11/1999 | Kawakawaguchi | H01L 21/02021 257/E21.237 |
| 6,042,455 | A | * | 3/2000 | Togawa | B24B 37/345 451/45 |
| 6,722,960 | B2 | * | 4/2004 | Brooks | B24B 7/28 144/136.1 |
| 6,726,547 | B2 | * | 4/2004 | Narusaki | B24D 5/12 29/281.1 |
| 6,953,392 | B2 | * | 10/2005 | Ashjaee | H01L 21/67173 451/288 |
| 7,347,765 | B2 | * | 3/2008 | Koch | B23Q 7/1405 451/10 |
| 2001/0031614 | A1 | * | 10/2001 | Morkvenas | B24B 7/12 451/270 |
| 2002/0004358 | A1 | * | 1/2002 | Vepa | B24B 7/228 451/41 |
| 2004/0198196 | A1 | * | 10/2004 | Walsh | B24B 7/22 451/58 |
| 2005/0130570 | A1 | * | 6/2005 | von Schumann | B24B 7/06 451/184 |
| 2006/0226584 | A1 | | 10/2006 | Maeda | |
| 2007/0119036 | A1 | | 5/2007 | Parmenter et al. | |
| 2007/0197144 | A1 | * | 8/2007 | Kumahara | B24B 9/065 451/67 |
| 2007/0289385 | A1 | | 12/2007 | Kiuchi | |
| 2010/0080676 | A1 | | 4/2010 | Niitani et al. | |
| 2011/0250466 | A1 | | 10/2011 | Muller et al. | |
| 2015/0367477 | A1 | * | 12/2015 | Hayashi | B24B 27/0069 451/59 |

FOREIGN PATENT DOCUMENTS

| | | |
|---|---|---|
| CN | 2904602 Y | 5/2007 |
| CN | 101531255 A | 9/2009 |
| CN | 101553342 A | 10/2009 |
| CN | 101725641 A | 6/2010 |
| CN | 102348825 A | 2/2012 |
| CN | 102996625 A | 3/2013 |
| CN | 202825221 U | 3/2013 |
| CN | 202878012 U | 4/2013 |
| CN | 103639872 A | 3/2014 |
| CN | 103717350 A | 4/2014 |
| CN | 104175194 A | 12/2014 |
| CN | 204321751 U | 5/2015 |
| CN | 204341515 U | 5/2015 |
| DE | 2544666 A1 | 4/1977 |
| DE | 202012008938 U1 | 11/2012 |
| EP | 0336312 A2 | 10/1989 |
| EP | 0768145 A2 | 4/1997 |
| EP | 1801577 A1 | 6/2007 |
| FR | 2568861 A1 | 2/1986 |

OTHER PUBLICATIONS

International Search Report for Application No. PCT/DE2016/200365, dated Dec. 2, 2016, 7 Pages.
Chinese Office Action for Chinese Application No. 201680043959.0, dated Aug. 14, 2019, 9 Pages.
Office Action for Chinese Application No. 201680043959.0, dated Dec. 24, 2018, 10 pages.

\* cited by examiner

METHOD FOR PRODUCING BEARING COMPONENTS BY MEANS OF A PRODUCTION LINE, PRODUCTION LINE AND PRODUCTION SYSTEM

CROSS-REFERENCE TO RELATED APPLICATIONS

This application is the U.S. National Phase of PCT/DE2016/200365 filed Aug. 10, 2016, which claims priority to DE 102015215624.9 filed Aug. 17, 2015, the entire disclosures of which are incorporated by reference herein.

TECHNICAL FIELD

The disclosure relates to a method for producing bearing components by means of a production line which comprises at least one grinding machine, at least one honing machine, at least one cleaning unit and at least one transport unit, wherein each bearing component is transported along the production line by using the at least one transport unit, wherein at least one grinding process of each bearing component occurs by using the at least one grinding machine, at least one honing of each bearing component occurs by using the at least one honing machine and at least one cleaning of each bearing component occurs in the at least one cleaning unit. The disclosure further relates to a production line for the production of bearing components, comprising at least one grinding machine, at least one honing machine, at least one cleaning unit and at least one transport unit, wherein the bearing components can be transported along the production line by using the at least one transport unit and can thereby be brought to the at least one grinding machine, to the at least one honing machine and to the at least one cleaning unit. The disclosure further relates to a to a production system that is comprising two of such production lines.

BACKGROUND

Methods and production lines are already well known, e.g. in the production of bearing components in form of bearing rings. The individual stations within the production line, such as a grinding machine, a honing machine, a cleaning unit, etc. are referred to in a simplified way as production system in the following. Hereby, the bearing components are treated in one production unit and transferred to the next production unit, wherein one transport unit is responsible for e.g. the bringing of one bearing component to one production unit and a transfer of the bearing component to the production unit and/or for a taking over of the bearing component from the production unit, a transport of the bearing component and a transfer of the bearing component to a production line, which is referred to as production system in the following. It is furthermore possible that a transport of the bearing component through a production unit is carried out by using the at least one transport unit. A transport unit can thus be a component of a production unit or be designed as a separate unit. Production units are hereby usually combined to one production line, which are of a different construction type and have to carry out different tasks. The result is that production units with different dimensions, infeed and discharge levels for the bearing component and furthermore different processing times for the bearing component have to be placed in a successive order. Any problems in the construction of a production line, that are arising thereof, are usually eliminated in that the at least one transport unit is configured and used in such a way that it can compensate height differences between production units that are following each other and that are connected, to place the bearing component into the necessary position for the following production unit, e.g. by means of turning over, turning around or tilting etc., and to provide an intermediary storage for bearing components that are not processed right away. Such a handling of the bearing components within a production line is elaborate and furthermore requires that the bearing components are subject to continuous mechanical intervention. One bearing component is e.g. picked up by using grippers, rolled out via ramps or guided by using slides, transported upwards in lifting devices or the like, wherein the bearing components can also come into contact with each other or bang against each other.

It has become evident, that such a method influences the surface quality and dimensional accuracy or the achievable tolerances of the bearing components.

SUMMARY

It is thus an objective of the disclosure to present an improved method in this regard for producing bearing components by using a production line. It is furthermore an objective of the disclosure to provide a production line or a production system for producing bearing components with a high dimensional accuracy.

This objective may be achieved for the method to produce bearing components by using a production line which comprises at least one grinding machine, at least one honing machine, at least one cleaning unit and at least one transport unit, wherein each bearing component is transported along the production line by using the at least one transport unit, wherein at least one grinding process of each bearing component occurs by using the at least one grinding machine, at least one honing of each bearing component occurs by using the at least one honing machine and at least one cleaning of each bearing component occurs in the at least one cleaning unit, in that a vertical grinding machine is used as a grinding machine and in that each bearing component is transported throughout the production line on an steady horizontal level in a lying position.

This objective may be achieved for the production line for producing bearing components, in particular of bearing rings, comprising at least one grinding machine, at least one honing machine, at least one cleaning unit and at least one transport unit, wherein the bearing components can be transported along the production line by using the at least one transport unit and can thereby be brought to the at least one grinding machine, to the at least one honing machine and to the at least one cleaning unit, in that the at least one grinding machine is a vertical grinding machine and in that the production line is constructed in such a way that the bearing components travel throughout it on an steady horizontal level.

It has become evident that a significant improvement of the dimensional accuracy of a bearing component can be achieve if the amount of mechanical intervention, to which the bearing component is exposed, can be reduced. It has become particularly evident that it may be especially effective with regard to the achieved dimensional accuracy and the desired low tolerances, if the bearing component is transported throughout the production line on an steady horizontal level. Hereby, a shifting of the vertical position of the center of mass of a bearing component for up to +10 cm, in particular up to +5 cm, is still viewed as a transport in a steady horizontal level. But this requires that production units are used, which make such an approach possible. It has hereby become evident that it may include that the at least one grinding machine is provided in form of a vertical grinding machine. Such a vertical grinding machine can be integrated into a production line, in which the bearing components are transported throughout the production line on a steady horizontal level. A reduction of a touching between bearing components can be achieved and has a positive effect on the dimensional accuracy and the tolerances of a bearing component. To a large extent, it is possible to accomplish the transporting of bearing components throughout the production line on a steady horizontal level without the use of grippers, ramps and slides.

Rolling bearings, that are produced with bearing components such as bearing rings, rolling bearing bodies, rolling bearing cages etc. in accordance with the method according to the disclosure, feature low tolerances, a high dimensional accuracy and a particularly smooth running.

Especially a bearing ring, in particular a bearing outer ring or a bearing inner ring is hereby formed as bearing component, wherein the grinding method comprises a step of the internal grinding of the bearing ring by using a first vertical grinding machine. To the extent that the bearing ring is designed as a bearing inner ring, the grinding treatment furthermore may include a step of the external grinding of the bearing inner ring by using a further vertical grinding machine. In the production method, it is particularly possible to arrange for a processing sequence at the bearing inner ring, in which first a method is carried out by using an external grinding (corresponding to a grinding of the track of the bearing inner ring) and subsequently a method by using an internal grinding (corresponding to a grinding of a bore hole of the bearing inner ring), as well as a processing sequence, in which first a method is carried out by using an internal grinding and subsequently a method by using an external grinding. In this respect, a sequence of a first and of further vertical grinding machines within a production line can be selected as desired.

The at least one honing machine may be designed as a vertical honing machine in one embodiment of the method or of the production line. Such a vertical honing machine can be ideally integrated into a production line that is comprising vertical grinding machines, and also allows for the transporting of the bearing component throughout the production line on a steady horizontal level. The connection between a vertical grinding machine and a vertical honing machine may be designed by using a transport unit in the form of a conveyor belt. Alternatively, it is possible to integrate a transport unit into the honing machine and to integrate a further transport unit into the vertical grinding machines in order to create a connection between these production units.

The production line used in the method furthermore may comprise at least one demagnetization unit, wherein the bearing component is being demagnetized after the grinding and/or after the honing procedure. Accordingly, the production line may also comprise at least one demagnetizing unit for the demagnetizing of the bearing components. The demagnetization step allows for a thorough cleaning of the processed bearing component of adherent metal particles or metal chips.

The bearing component may be cleaned after the honing and/or after the demagnetization in the at least one cleaning unit. This serves to clean the bearing components, wherein the removal of adherent metal particles or metal chips, lubricating oil, cutting fluids, dirt and the like is carried out. A cleaning unit may include a washing unit and/or a gas stream cleaning unit.

The production line used in the method furthermore may include at least one measuring unit, wherein the bearing component is being measured before the grinding method and/or after the grinding method and/or after the honing method. Accordingly, the production line furthermore may include at least one measuring unit for the measuring of the bearing components. Such a measuring unit, in particularly if it is arranged after a vertical grinding machine, allows for a control action on the parameters following the production units and the attaining of particularly high dimensional accuracy.

A sequence of the production units used within a production line is not predetermined, but can be selected as required. Amongst other things, the following sequences of production units, which are only mentioned as examples in this case, may be present:

a) First vertical grinding machine-at least one further vertical grinding machine-vertical honing machine-measuring unit-demagnetizing unit-cleaning unit b) First vertical grinding machine-at least a further vertical grinding machine-measuring unit-vertical honing machine-measuring unit-further vertical honing machine-demagnetizing unit-cleaning unit c) Cleaning unit-vertical grinding machine-vertical honing machine-cleaning unit-measuring unit-demagnetizing unit-cleaning unit Many further meaningful sequences are possible by using the aforementioned production units, wherein a transfer between the production units can be carried out via one or several transport units, which are separate and/or integrated into the production units.

Bearing components in the form of bearing rings may be produced with diameters in the range of 10 to 500 mm, particularly in the range of 15 to 460 mm.

Further production units may include at least one of the following units such as a milling machine, a lathe, a lapping machine, a drilling machine, a punching unit, a pressing unit, a heat treatment unit, a drying unit, an automatic feeding unit and/or at least one automatic packaging unit, an automatic measuring and control unit, can be included in the method according to the disclosure and in the production line according to the disclosure.

A production system has proved to be reliable, which comprises at least two production lines according to the disclosure as well as at least one control lane, wherein one respective production line is arranged on each side of the control lane, whose operating and display units are arranged in such a way that they are facing each other.

To the extent that the production system comprises a first production line for the production of a bearing inner ring and a second production line for the production of a bearing outer ring, it is possible to bring a respective bearing inner ring and a bearing outer ring together directly at the end of each production line and to carry out a subsequent assembling of a complete rolling or sliding bearing.

The bearing components particularly travel throughout the two production lines of the production system on the same horizontal level E. This simplifies the process of bringing together completely processed bearing components from different production lines.

Within a production system, it has proven to be good, if each operating lane features a width in the range of 0.75 to 1.5 m.

It is particularly advantageous if the production system comprises at least one further assembly station, which is successively interlinked with the at least two production lines, and which is configured for a final assembling of a rolling or sliding bearing comprising the bearing components that came from the production lines. An intermediate storage of the produced bearing components can be omitted, which also eliminates the danger that the dimensional accuracy of the produced bearing components could be negatively affected once more, for example by use of necessary mechanical intervention during the intermediate storage, e.g. by a contact between the finished bearing components.

BRIEF DESCRIPTION OF THE DRAWINGS

The FIGS. 1 to 6 should explain a method and a production line according to the disclosure as well as a production system by means of an example. It is shown.

DETAILED DESCRIPTION

Figure 1:
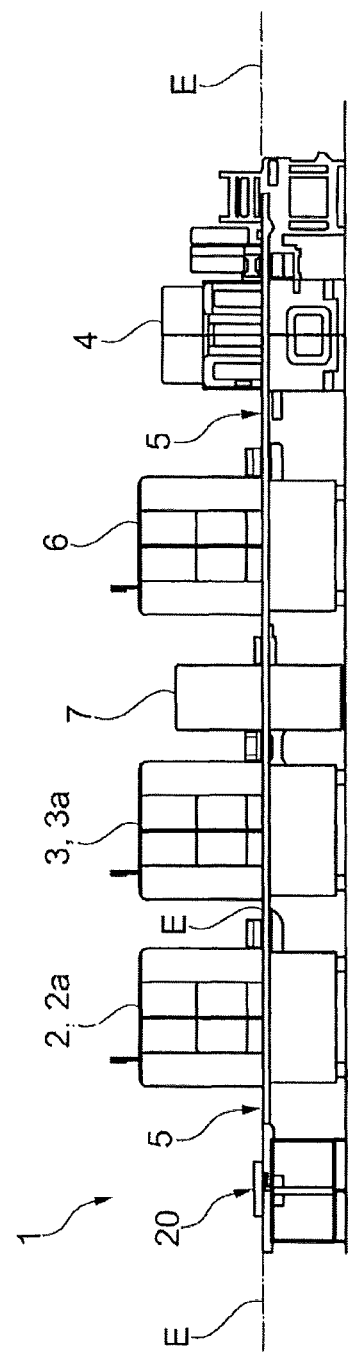
FIG. 1 a production line in the front view.

FIG. 1 depicts a production line 1 in the front view for producing bearing components, in particular bearing rings 20, comprising a grinding machine 2, a honing machine 3, a cleaning unit 4 and transport units 5. A measuring unit 7 and a demagnetizing unit 6 are furthermore provided between the honing machine 3 and the cleaning unit 4. The bearing components are transported throughout the production line 1 by using a transport units 5 and thereby successively brought to the grinding machine 2, to the honing machine 3, to the measuring unit 7, to the demagnetizing unit 6 and to the cleaning unit 4. The grinding machine 2 is hereby designed in form of a vertical grinding machine 2a. The honing machine 3 is hereby designed as a vertical honing machine 3a. The production line 1 is furthermore configured in such a way that the bearing components can be transported throughout it on a steady horizontal level E in a lying position. The transport units 5 are designed as conveyer belts, they are directly adjacent to each other and are arranged to transport the bearing components that need to be processed within the horizontal level E throughout production line 1. It is thereby possible that transport units 5, which are integrated into the production units, and/or separate transport units 5 are used in the production line 1.

Same reference signs identify same elements within the following FIGS. 2 to 6.

Figure 2:
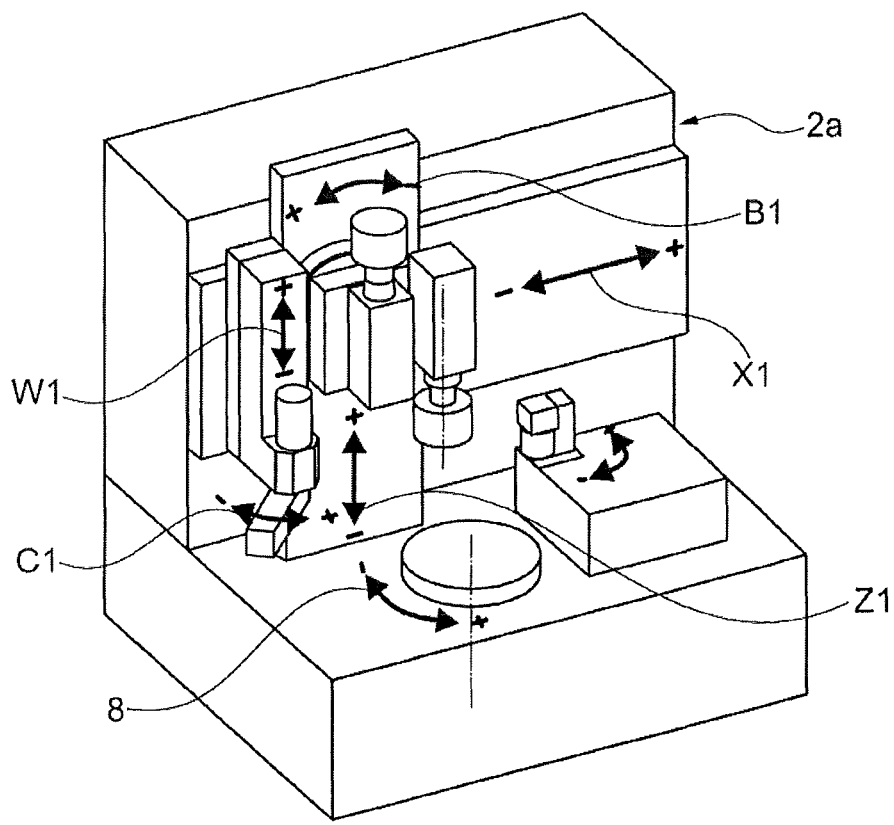
FIG. 2 a schematic section of a vertical grinding machine.

FIG. 2 illustrates a schematic section from a vertical grinding machine 2a with working tool axes B1, C1, W1, X1, Z1, a tool spindle 8 and two grinding spindles for a flexible grinding operation of bearing components.

Figure 3:
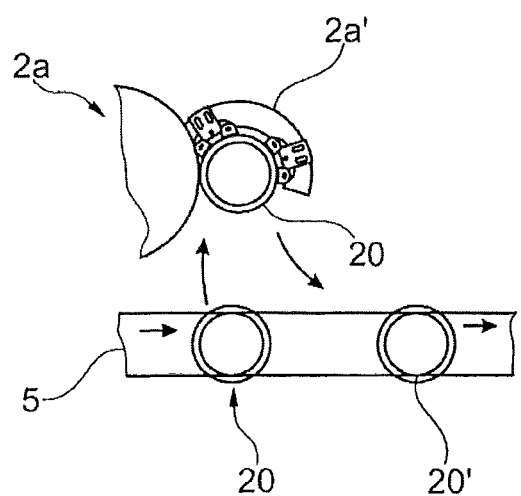
FIG. 3 a processing of a bearing component within a grinding device of a vertical grinding machine.

FIG. 3 depicts in the top view a processing of a bearing component in form of a bearing ring 20 within a vertical grinding machine 2a by using a grinding device 2a'. Bearing ring 20 is transported in a lying position in the direction of the arrow on a transport unit 5, and is brought to the grinding device 2a' by using a (not depicted) pusher, and is grinded in its lying position. After completing the grinding operation, the polished bearing ring 20 is transferred to transport unit 5 in lying position and continues to be transported further in that lying position. There is no turning or tilting of bearing ring 20, 20' in the course of the grinding operation.

Figure 4:
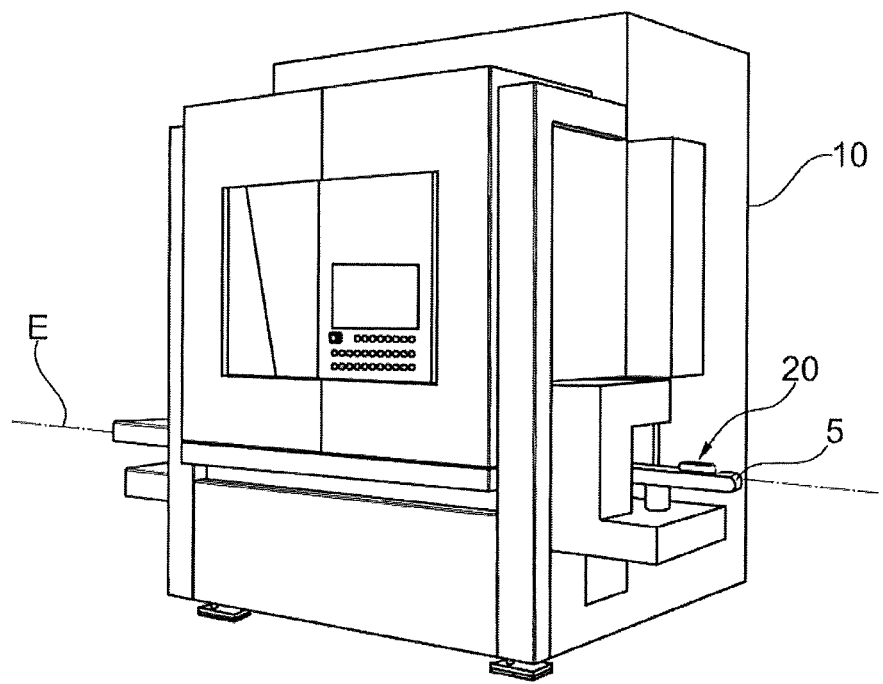
FIG. 4 a production unit with a transport unit.

FIG. 4 depicts an embodiment of a production unit 10 for a production line 1 in a three-dimensional view. Such a production unit 10 can represent a grinding machine 2, a honing machine 3, a cleaning unit 4, a measuring unit 7 or a demagnetizing unit 6. The production unit 10 comprises an integrated transport unit 5 in form of a conveyer belt, on which a bearing component, in this case a bearing ring 20, can be transported throughout the production unit 10 in a lying position on a horizontal level E.

Figure 5:
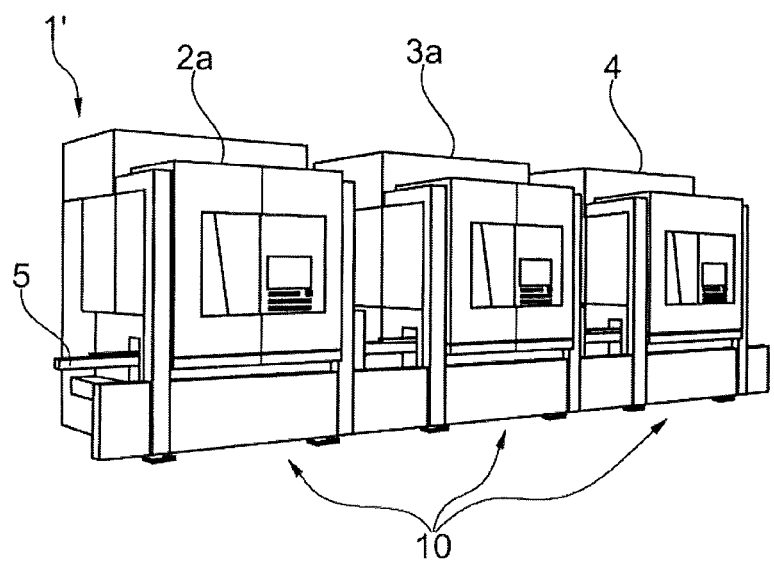
FIG. 5 another production line comprising 3 interlinked production units according to FIG. 4.

FIG. 5 depicts a further production line 1' comprising three interlinked production units 10 according to FIG. 4 in form of a vertical grinding machine 2a, a vertical honing machine 3a and a cleaning unit 4. The further production line 1' comprises a transport unit 5 in form of a conveyer belt, on which a bearing component can be transported throughout the production line 1 on a horizontal level E in a lying position.

Figure 6:
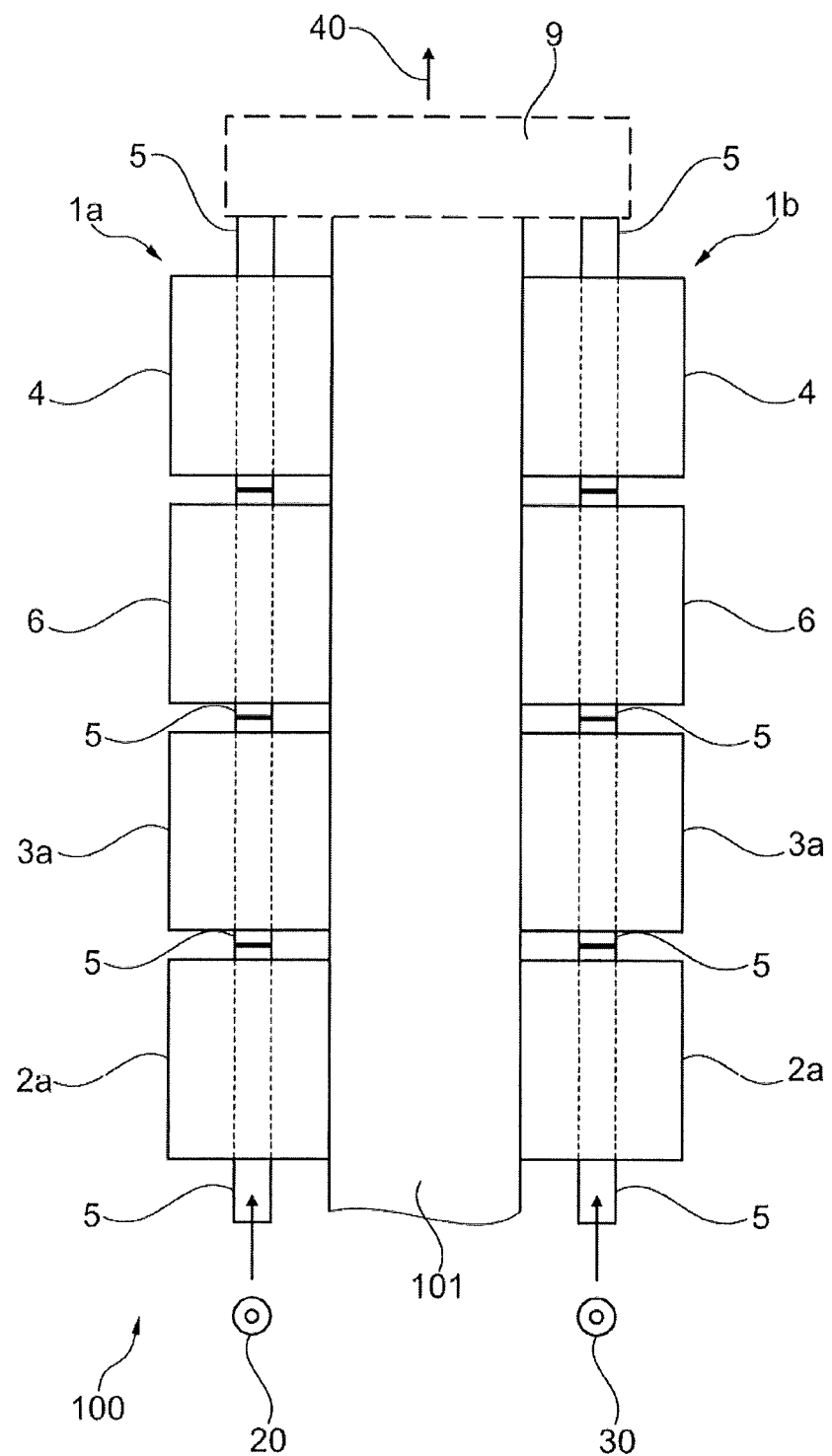
FIG. 6 a production system with two production lines.

FIG. 6 shows a schematic depiction of a production system 100 comprising two production lines 1a, 1b in top view. The two production lines 1a, 1b are arranged on the right and left along an control lane 101. Operating and display units of the two production lines 1a, 1b are hereby arranged in such a way that they are facing each other. A person located in the control lane 101 can simultaneously keep an eye on both production lines 1a, 1b and, when necessary, access their controls. Bearing components in form of bearing rings 20, 30, that need to be processes, are furthermore illustrated, which are transported throughout the respective production line 1a, 1b in the direction of the arrow. Within each production line 1a, 1b, e.g. a vertical grinding machine 2a, a vertical honing machine 3a, a demagnetizing unit 6 and a cleaning unit 4 are interlinked with each other, to which the bearing rings 20, 30 are subsequently brought for a treatment or a processing by using transport units 5.

It is hereby possible to interlink as many production units as desired, and it is possible that there are different and/or same production units within one individual production line. Thus, it is also possible to arrange for several vertical grinding machines and/or vertical honing machines in a parallel manner, which are interlinked with one individual and possibly a faster operating subsequent production unit. It is also not necessary that both production lines, that can be operated from the control lane, are designed in the same way when viewed in the transporting direction of the components or that same or similar bearing components are processed by both production lines.

If several control lanes exist, these may be aligned parallel to each other, wherein e.g. two production systems are arranged next to each other in accordance with FIG. 6. Hereby, the respective sides of the production units that are facing away from the control lane 101 may be aligned to the sides of the production units that are facing away from the further parallel control lane, to which this further control lane is aligned.

An assembly unit 9 is arranged after the two production lines 1a, 1b, to which the completely processed bearing rings 20, 30 are transported to. An assembling of the bearing rings 20, 30 into a finished rolling or sliding bearing 40 is carried out in the assembly unit 9. It is thus possible that there is one respective production line for bearing components in the form of bearing inner rings, bearing outer rings, rolling bearing cages and bearing bodies, that are all interlinked with at least one subsequent assembly unit 9, in order to completely assemble a finished rolling or sliding bearing 40 from the bearing components in it.

REFERENCE SIGN LIST 1, 1', 1a, 1b Production line
2 Grinding machine,

2a Vertical grinding machine
2a Grinding device vertical grinding machine
3 Honing machine
3a Vertical honing machine
4 Cleaning unit
5 Transport unit
6 Demagnetizing unit
7 Measuring unit
8 Tool spindle
9 Assembly unit
10 Production unit
20, 30 Bearing ring
20' Polished bearing ring
40 Rolling or sliding bearing
100 Production system
101 Control lane
B1, C1, X1, W1, Z1 Tool axis
E Horizontal level

The invention claimed is:

1. A method for producing bearing components by utilizing a production line, comprising:
utilizing at least one grinding machine to grind each bearing component;
utilizing at least one honing machine to hone each of the bearing components;
utilizing at least one cleaning unit to clean each of the bearing components; and
utilizing at least one transport unit to transport each of the bearing components along the production line, wherein each bearing component is transported throughout the production line in a lying position, wherein the bearing component is formed as either a bearing outer ring or as a bearing inner ring, and that the grinding includes a step of an internal grinding of the bearing ring by utilizing a vertical grinding machine.

2. The method of claim 1, wherein the bearing component is formed as a bearing inner ring, and that the grinding furthermore includes a step of an external grinding of the bearing component by utilizing the vertical grinding machine.

3. The method of claim 1, wherein the at least one honing machine is a vertical honing machine.

4. The method of claim 1, wherein the method also includes utilizing at least one demagnetization unit, and that the bearing component is demagnetized after the grinding or after the honing.

5. The method of claim 4, wherein the bearing component is cleaned in the at least one cleaning unit after the honing or after the demagnetizing.

6. The method of claim 1, wherein the method also includes utilizing at least one measuring unit and that the bearing component is measured either before the grinding, after the grinding, or after the honing.

7. The method of claim 1, wherein the outer bearing ring features a diameter between 10 to 500 mm.

8. A production line for producing bearing components comprising:
at least one grinding machine;
at least one honing machine;
at least one cleaning unit; and
at least one transport unit, wherein each bearing components can be transported along the production line using a transport unit, and can thereby be brought to the at least one grinding machine, to the at least one honing machine, and to the at least one cleaning unit, wherein the at least one grinding machine is a vertical grinding machine, and that the production line is configured to allow the bearing components to travel on a horizontal plane, wherein a first and second respective production line are arranged on each side of each control lane, whose operating and display units are arranged in such a way that the operating and display units are facing each other, and wherein the production line comprises at least one assembly station that is successively interlinked with the respective production line and which is configured for a final assembly of a rolling or sliding bearing comprising the bearing components that came from the production lines.

9. The production line of claim 8, wherein the at least one honing machine is a vertical honing machine.

10. The production line of claim 8, wherein the production line further includes at least one demagnetizing unit configured to demagnetize the bearing components.

11. The production line of claim 8, wherein the production line includes at least one measuring unit configured to measure the bearing components.

12. The production line of claim 8, wherein the bearing components of the first and second respective production line travel through on the same horizontal level.

13. The production line of claim 12, wherein each control lane features a width between 0.75 to 1.5 m.

14. A method for producing one or more bearing components along a production line, comprising:
honing the one or more bearing components along the production line;
cleaning the one or more bearing components along the production line;
grinding the one or more bearing components along the production line;
transporting the one or more bearing components along the production line utilizing one or more transport units; and
demagnetizing the one or more bearing components along the production line.

15. The method of claim 14, wherein the method further includes measuring the one or more bearing components along the production line.

16. The method of claim 14, wherein the one or more bearing components are transported along the production line in a lying position.

* * * * *